No. 656,150. Patented Aug. 14, 1900.
W. T. WOOD.
VAPOR LAMP.
(Application filed Mar. 11, 1899. Renewed Apr. 12, 1900.)
(No Model.) 2 Sheets—Sheet 1.
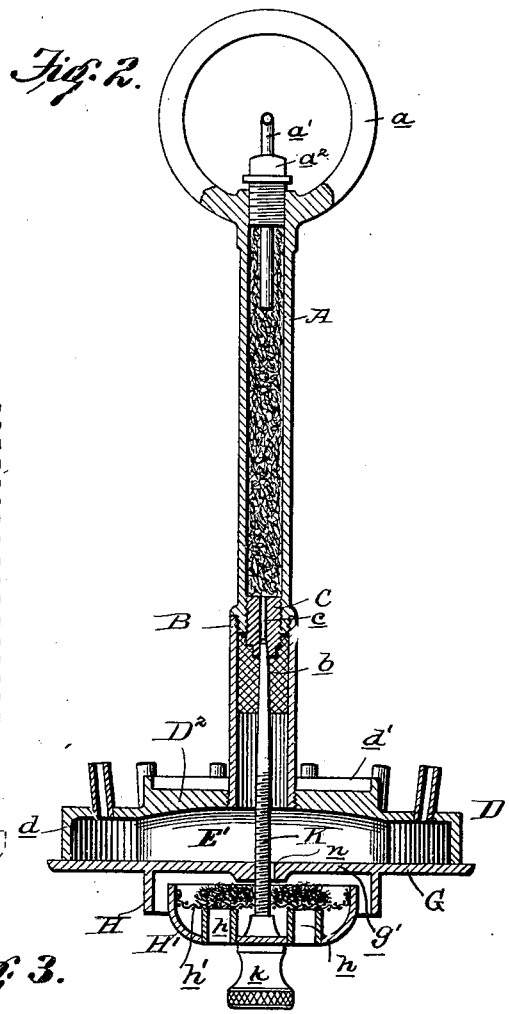

No. 656,150. Patented Aug. 14, 1900.
W. T. WOOD.
VAPOR LAMP.
(Application filed Mar. 11, 1899. Renewed Apr. 12, 1900.)
(No Model.) 2 Sheets—Sheet 2.
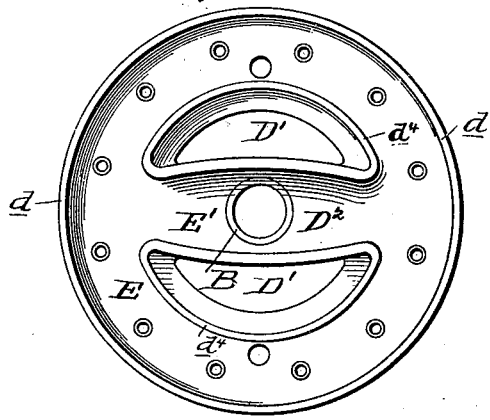
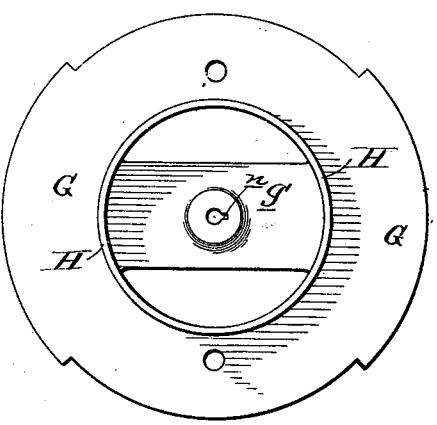
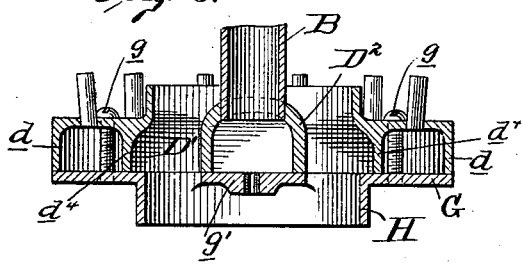
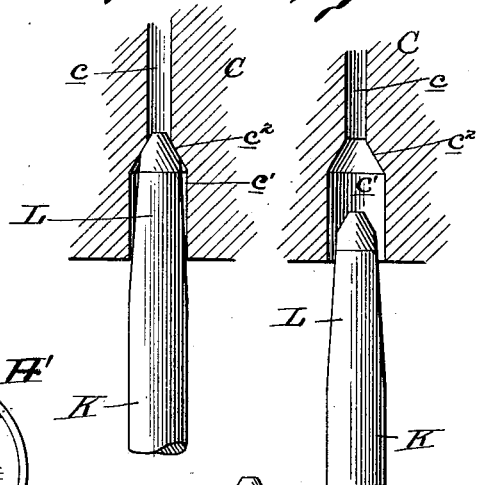
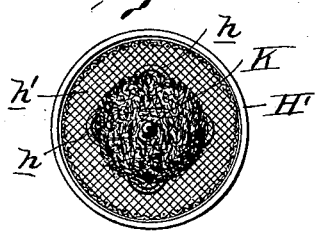
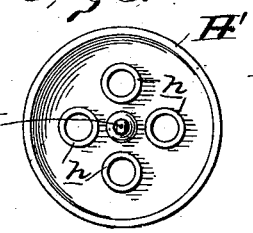
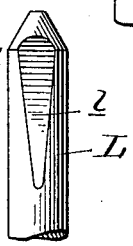
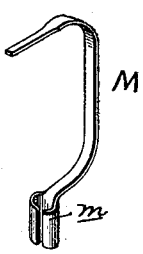
Witnesses:
G. A. Pennington
Jos. F. Milan
Inventor:
William T. Wood
by R. S. Bacon
Atty.

UNITED STATES PATENT OFFICE.

WILLIAM T. WOOD, OF NASHVILLE, TENNESSEE.

VAPOR-LAMP.

SPECIFICATION forming part of Letters Patent No. 656,150, dated August 14, 1900.

Application filed March 11, 1899. Renewed April 12, 1900. Serial No. 12,631. (No model.)

*To all whom it may concern:*

Be it known that I, WILLIAM T. WOOD, a citizen of the United States, residing at Nashville, in the county of Davidson and State of Tennessee, have invented certain new and useful Improvements in Vapor-Lamps; and I do hereby declare the following to be a full, clear, and exact description of the invention, such as will enable others skilled in the art to which it appertains to make and use the same.

This invention relates to an improvement in "vapor-lamps," more particularly to that class of lamps wherein hydrocarbon fluid is employed, the fluid being converted into a gas, which latter is mixed with air and when ignited forms what is commonly called a "blue flame." The burner is adapted to be used in connection with non-combustible mantles which are rendered incandescent by the heat of the flame.

One object of the invention is to provide a so-called "vapor-lamp" which can be used with great success for lighting purposes.

A further object of the invention is to provide a burner, or what may be more properly termed a "lamp," wherein hydrocarbon gas can be employed successfully for rendering the illuminating-mantles brilliantly incandescent and so arrange the parts of the lamp that the fluid can easily be controlled and the various parts so constructed and arranged that the lamp can be manufactured at comparatively-small cost.

The other objects of my invention will be presently stated.

In the drawings I have shown the form of the lamp forming the subject-matter of the invention, which form is an operative embodiment of the invention; but I desire it understood that the form illlustrated is shown for the purpose of this specification and not for the purpose of limitation, as other forms, arrangements, and constructions can be adopted without departing from the nature and principle of the invention.

Figure 1 is a side elevation of the lamp with the globe shown in dotted lines. Fig. 2 is a longitudinal vertical section showing the parts in elevation. Fig. 3 is a plan and section taken on the lines 3 3 of Fig. 1. Fig. 4 is a bottom plan view of the base of the lamp with the bottom plate removed. Fig. 5 is a bottom plan of the closing-plate. Fig. 6 is a section on the line 6 6 of Fig. 3. Fig. 7 is a plan view of the drip-cup, showing the pad and gauze in position; and Fig. 8 is a similar view without the pad and gauze. Figs. 9, 10, and 11 are large details of the valve, and Fig. 12 is a perspective view of the mantle-support.

In the drawings, A represents a vertically-disposed tube the interior of which constitutes a chamber which is filled with a filtering material—such as steel wool or other non-combustible material. The upper end of this tube is fashioned into a suspending-ring $a$, and into the upper end of the chamber is led a supply-pipe $a'$ through a suitable coupling $a^2$, the pipe being connected with a suitable flexible hose or tubing A', leading from a remote tank or holder in which gasolene is stored, the gasolene being held under pressure. The lower end of the tube A has secured thereto a tubular extension B, having side openings $b$ therein which are conveniently spanned by a wire-netting. These openings are located on the opposite sides of the extension B, at or near the upper end thereof, being thereby in close proximity to the lower end of the tube A. The tube A has in its lower end a screw-plug C, having a cylindrical escape-opening $c$, the lower end being enlarged into a chamber $c'$, the walls between the passage $c$ and chamber $c'$ being inclined, as at $c^2$, to form a valve-seat, as more clearly shown in Figs. 9 and 10. The lower end of the extension B is screw-threaded and supports what I conveniently term the "lamp-base" D. This base is of a peculiar formation and consists of a casting having an annular flange $d$ at its outer edge and a cylindrical upwardly-extending flange $d'$, which surrounds the central opening D', the latter being spanned by an inverted-trough-shaped bridge-piece D², formed integral with the base D. The lower edges of the side walls of the bridge-piece are conveniently on a plane with the edges of the outer flange $d$, and at the center of the bridge-piece is formed a screw-threaded opening into which the lower end of the extension B is fitted. By this construction and arrangement of the bridge-piece the side openings are formed on opposite sides for purposes presently to be stated. Extending from the ends of the side walls of the bridge-piece are semicircular flanges $d^4$, as shown more particularly in Fig. 4, the same extending down to a point parallel with the lower edges of the bridge-piece and forming, in connection with the bridge-piece and the flange $d'$, the walls of the opening $D'$. By referring to Fig. 4 it will be seen that the interior of the base is divided into the annular chamber E and the cross-chamber E', the latter being formed by the bridge-piece. From the annular chamber lead a series of small burners F, arranged conveniently an equidistance apart and extending at a slight incline upward above the base of the lamp.

G represents the bottom plate, which is secured to the base by screws $g$. This bottom plate is formed with the flat upper face, an open center, spanned by a flat cross-piece $g'$. The plate and cross-piece are fashioned to correspond substantially with the shape and dimensions of the annular and cross chambers in the base and fit when adjusted closely against the lower edges of the flanges $d$ $d^1$ and the edges of the bridge-piece, as shown in Fig. 6, thus closing the chambers against the escape of the fluid except through the burners. The opening in the base-plate is surrounded by depending flange H, and the open space on the opposite sides of the cross-piece forms passages to the openings in the base of the opposite sides of the bridge.

H' designates a drip-cup located within the flange H, but of a diameter less than the diameter of the flange. This drip-cup is formed with a series of upwardly-extending tubes or nipples $h$, which extend part way the depth of the cup. There are conveniently four of these nipples, and on their upper face is supported the diaphragm of gauze $h'$. On the upper face of the gauze is supported a pad of steel wool or other non-combustible material. The drip-cup H' is fixedly secured on the screw-threaded stem K, a suitable handle or knob $k$ being attached to the lower end thereof below the cup. The stem, which I shall term the "valve-stem," passes through the threaded opening in the cross-piece $g'$ and is in itself threaded, so that by turning the valve-stem the drip-cup is moved up and down. The upper end of the valve-stem is fashioned to constitute a valve and is of the following construction: The cylindrical portion of the stem directly below the end, as at L, is chamfered or flattened on the opposite sides, as at $l$, so that the width between the chamfered portions is less than the diameter of the chamber $c'$, the variation decreasing toward the lower end of the chamfered portion. The upper end of the stem is conical or frustum shape and is fashioned to correspond with the inclined valve-seat formed between the chambers $c'$ and passage-way $c$. By this construction it will be observed that as the valve-stem is lowered the amount of vapor escaping is not only proportioned by the adjustment of the conical portion, but is also governed largely by the chamfered or flattened sides $l$, and the farther the valve is lowered the larger the space for the escape of the gas or fluid. In effect, the valve is a double valve, and the necessity of the common needle-point valve in this class of burner is avoided. It will be noticed that the valve is used without packing and is manipulated from the lower side or most convenient point and that the same can be readily removed and cleaned from any adhering matter or substance.

M designates a mantle-support, which consists of a socketed lower end $m$, having an arm extending outward, then upward, and finally horizontally inward. On the upper end of the horizontal portion is secured a small mantle. (Shown in dotted lines in Fig. 1.) The socket portion is so fashioned that it fits over the tubular burner, so that the entire support with the mantle can be readily removed. Each burner will be supplied with its support.

In Fig. 1 I have shown in dotted lines a globe which is arranged to fit on the projecting edges of the closing-plate of the base. In operation the fluid gasolene is held under pressure in the tank, fed into the chamber of the tube A, and filters through the steel wool therein. The valve is adjusted to allow the fluid to escape into the extension B, and it then trickles down the valve-stem and passes through the screw-threaded opening, which is conveniently large enough to permit its passage, or, as shown in Figs. 2 and 3, a small slot $n$, onto the pad of steel wool, which soon becomes saturated therewith. The air passing up through the nipples of the drip-cup carries the vapor up through the passage on the opposite sides of the bridge, and the vapor is ignited within the central annular flange on the base surrounding the lower part of the extension B. By igniting the vapor at this point heat is generated and the fluid converted into a gas, which issues with force through the valve-opening, drawing the air in through the netted openings of the side of the part B, and carries the mingled gas and air into the chambers E and E', from whence it escapes through the burner-tubes and is ignited, forming a blue flame, which quickly transforms the mantles into incandescent bodies. The degree of the brilliancy of the mantles can be regulated by the adjustment of the valve. It will be understood that as soon as the fluid is transformed into a gas the supply to the pad of the drip-cup will cease and the flame at the base die out. The parts can be readily taken apart for cleaning when desired. The mantle being small is necessarily inexpensive and less apt to be broken. The lamp can be hung at any convenient place, according to the length of the supply-tube.

Having thus described my invention, what I claim as new, and desire to secure by Letters Patent, is—

1. In a vapor-lamp, the combination with a base having an annular chamber and an opening, of an inverted substantially U-shaped bridge-piece spanning the opening and dividing the same, the interior thereof forming a cross-chamber in the base, a removable base-plate formed with openings registering with the openings in the base and constituting a bottom for the chambers, a vapor-supply pipe leading into the crown of the bridge-piece, a valve in the pipe having a stem projecting through the bridge and base-plate, a drip-cup below the openings in the base having an absorption-pad therein and burners communicating with the annular chamber in the base, substantially as described.

2. In a vapor-lamp, the combination with a hollow base member having openings therethrough and a series of burners, of a tubular support connecting with the base member and having air-inlet openings at its lower end adjacent to the burners, a valve-seat in the supporting tubular member adjacent said inlet-openings, a supply to said tubular member and a valve engaging said valve-seat from below and having a stem projecting through the base and terminating in a suitable handpiece below the base, substantially as described.

3. In a vapor-lamp, the combination with a base formed with an annular flange at its outer edge, an opening at the center having depending flanges $d^4$ forming an outer wall to the opening, of a bridge-piece spanning the opening, its sides constituting a continuation of the base and forming the bottom flanges $d^4$, a plate G removably secured to the walls to the hollow bridge-piece and the spaces between the outer flange and the flanges $d^4$ and having openings therein on the opposite sides of the bridge-piece, a hollow support connected with the bridge-piece having side openings above the base and a valve-seat adjacent to the openings, a wire-gauze spanning said openings in the support, a supply-pipe leading into the support, a valve-stem carrying a valve at its upper end engaging the valve-seat, the stem passing through the base-plate, a drip-cup carried by the stem and a pad on the drip-cup surrounding the stem below the opening through which the latter passes, substantially as described.

4. In a vapor-lamp, the combination with a base having an opening therein and a series of burners, of a support extending above the base having a valve-seat and air-inlet openings adjacent thereto located at the lower end of the support and a vertically-disposed valve-stem adjustably secured in the base having a valve at its upper end and a support carried by the valve-stem having a noncombustible pad arranged directly below the opening in the base through which the valve-stem passes for the purpose described.

5. In a vapor-lamp, the combination with a base, having a chamber therein, and a series of burners communicating with the chamber, of a centrally-arranged hollow support having a valve-seat near its base and an inlet-opening adjacent thereto, a valve and means for controlling the same extending below the base, a vapor-inlet pipe, and means for creating a preliminary flame at the center of the lamp, substantially as described.

6. In a vapor-lamp, the combination with the lamp, of a valve-seat member having an enlarged chambered portion below the seat and a valve having a tapered portion engaging the seat and a portion directly below said engaging portion formed with reduced sides of varying depth, substantially as described.

7. The combination with a valve-seat member formed with an enlarged chamber below the seat portion, of a valve member having a tapered portion fashioned to fit the seat and inclined opposite side portions arranged to extend into the enlarged chamber, substantially as described.

8. A valve for the purposes described consisting of a valve-seat and an enlarged passage below the same, and a valve having a tapered portion fashioned to fit the valve-seat and of substantially the diameter of the enlarged passage, its side being formed with inclined reduced portions working in the enlarged passage, substantially as described.

9. In a vapor-lamp, the combination with a hollow base having a burner thereon and formed with an air-passage, of a tubular member having an air-inlet opening adjacent to and opposite the burner, a valve-seat opposite the air-opening and a valve engaging the seat, substantially as described.

10. In a vapor-lamp, the combination with a tubular member having an air-inlet opening therein, and a controlling-valve adjacent the opening, of a hollow base having a burner opposite and adjacent to the said air-inlet, and an air-passage through which air is drawn into the space between the burner and air-inlet opening and a supply-conduit leading into the tubular supply, substantially as described.

In testimony whereof I affix my signature in presence of two witnesses.

WILLIAM T. WOOD.

Attest:
  G. R. OGLESBY,
  HARRY MYERS.